(12) United States Patent
Werni et al.

(10) Patent No.: US 9,540,976 B2
(45) Date of Patent: Jan. 10, 2017

(54) PARTICLE FILTER

(71) Applicant: EBERSPÄCHER EXHAUST TECHNOLOGY GMBH & CO. KG, Neunkirchen (DE)

(72) Inventors: Marcus Werni, Waiblingen (DE); Oleksander Vyelyayev, Stuttgart (DE); Simon Ehrler, Ostfildern (DE); Andrew Summers, Denkendorf (DE)

(73) Assignee: EBERSPÄCHER EXHAUST TECHNOLOGY GMBH & CO. KG, Neunkirchen (DE)

(*) Notice: Subject to any disclaimer, the term of this patent is extended or adjusted under 35 U.S.C. 154(b) by 129 days.

(21) Appl. No.: 14/400,087

(22) PCT Filed: May 7, 2013

(86) PCT No.: PCT/EP2013/059428
§ 371 (c)(1),
(2) Date: Nov. 10, 2014

(87) PCT Pub. No.: WO2013/167556
PCT Pub. Date: Nov. 14, 2013

(65) Prior Publication Data
US 2015/0107458 A1    Apr. 23, 2015

(30) Foreign Application Priority Data

May 11, 2012  (DE) .......................... 10 2012 207 960

(51) Int. Cl.
*B01D 39/12*  (2006.01)
*F01N 1/00*  (2006.01)
(Continued)

(52) U.S. Cl.
CPC ........... *F01N 3/0211* (2013.01); *F01N 3/0217* (2013.01); *F01N 3/0335* (2013.01);
(Continued)

(58) Field of Classification Search
CPC ....... B01D 39/12; B01D 46/0024; F01N 1/00; F01N 3/0211; F01N 3/2853; F01N 3/043; F01N 13/18; F01N 13/1844
(Continued)

(56) References Cited

U.S. PATENT DOCUMENTS 3,769,780 A * 11/1973 Kasten ............... B01D 46/0024
                                                    55/463
5,571,298 A * 11/1996 Buck ...................... B01D 39/12
                                                    422/174
(Continued)

FOREIGN PATENT DOCUMENTS

EP    1 298 289 A1   4/2003
EP    2 233 708 A1   9/2010
(Continued)

OTHER PUBLICATIONS

Japanese Office Action of Nov. 24, 2015.

*Primary Examiner* — Jacob T Minskey
*Assistant Examiner* — Minh-Chau Pham
(74) *Attorney, Agent, or Firm* — McGlew and Tuttle, P.C.

(57) ABSTRACT

A particle filter (2) for filtering exhaust gas in an internal combustion engine includes a housing and a filter element. A simplified installation and/or simplified replacement of the filter element (5) and/or improved sealing of the housing (4) results if the filter element (5) is supported in an inner jacket (9), which is supported radially in an outer jacket (12) and is arranged so as to be axially movable in the outer jacket (12). The inner jacket (9) is axially supported on a ring (24), which is supported axially on a cover (22) that closes an installation opening (20) of the housing (4) via at least one supporting element (25) in order to transmit pressure forces. A muffler (1) is provided having such a particle filter (2), (Continued)

wherein a section of a muffler housing (3) of the muffler (1) forms the housing (4) of the particle filter (2).

20 Claims, 6 Drawing Sheets

(51) Int. Cl.
  *F01N 13/18* (2010.01)
  *F01N 3/021* (2006.01)
  *F01N 3/033* (2006.01)
  *B01D 46/00* (2006.01)
(52) U.S. Cl.
  CPC ..... *F01N 13/1827* (2013.01); *F01N 13/1888* (2013.01); *B01D 46/0005* (2013.01); *B01D 2279/30* (2013.01); *F01N 2230/02* (2013.01); *F01N 2450/24* (2013.01); *F01N 2450/30* (2013.01); *Y02T 10/20* (2013.01)
(58) Field of Classification Search
  USPC .......... 55/385.3, 502, DIG. 30; 60/311, 324; 138/137, 149; 422/169, 174
  See application file for complete search history.

(56) References Cited

U.S. PATENT DOCUMENTS

| | | | |
|---|---|---|---|
| 7,662,204 B2* | 2/2010 | Forster | F01N 3/2853 138/137 |
| 2005/0077104 A1* | 4/2005 | Flintham | F01N 1/00 181/243 |
| 2008/0016858 A1* | 1/2008 | Hill | F01N 3/0211 60/311 |
| 2010/0242450 A1 | 9/2010 | Werni et al. | |
| 2012/0266999 A1* | 10/2012 | Wirth | F01N 3/043 138/149 |
| 2014/0086802 A1* | 3/2014 | Werni | F01N 3/0211 422/169 |
| 2014/0325969 A1* | 11/2014 | Baumchen | F01N 13/1844 60/324 |

FOREIGN PATENT DOCUMENTS

| | | |
|---|---|---|
| EP | 2 333 263 A1 | 6/2011 |
| JP | 2008-106663 A | 5/2008 |
| WO | 92/18226 A1 | 10/1992 |
| WO | 2011/114823 A1 | 9/2011 |

* cited by examiner

US 9,540,976 B2

PARTICLE FILTER

CROSS REFERENCE TO RELATED APPLICATIONS

This application is a United States National Phase Application of International Application PCT/EP2013/059428 filed May 7, 2013 and claims the benefit of priority under 35 U.S.C. §119 of German Patent Application 10 2012 207 960.2 filed May 11, 2012, the entire contents of which are incorporated herein by reference.

FIELD OF THE INVENTION

The present invention relates to a particle filter for filtering exhaust gases and to a muffler having such a particle filter.

BACKGROUND OF THE INVENTION

Particle filters serve for the treatment of exhaust gases which are generated for example by an internal combustion engine. Accordingly, particles, such as for example soot and the like, are filtered out of the exhaust gas with the help of such a particle filter in order to otherwise treat or pass onto the environment the subsequently treated exhaust gas. For filtering particles, the particle filter comprises a filter element which is usually arranged fixed in a housing of the particle filter. Such a particle filter in this case can be part of an exhaust gas treatment device for the treatment of exhaust gases of an internal combustion engine, which for example comprises also a catalytic converter, for example for the reduction of nitrogen oxides. Through the filtering of the exhaust gas, wear occurs on the filter element which can in particular be caused through the deposition of said particles, of which the filter element cannot be freed despite a possible regeneration in the form of combustion and the like. This wear can reduce the efficiency of the filter element and lead to a failure of the particle filter. It is therefore necessary to replace the particle filter at preset intervals and/or when required. Accordingly, merely certain parts of the particle filter, in particular the filter element can be replaced. The replacement of the parts of the particle filter in particular of the filter element however usually involves major effort and is not easily possible.

Such a particle filter is known for example from WO 92/18226 A1. This particle filter comprises a housing and a filter element arranged in the housing. On sides which are located axially opposite, the filter element comprises end rings which axially support the filter element on the housing. Accordingly, the particle filter has a termination plate, which supports one of the end rings at an axial end and is fixed on the housing at the opposite axial end by means of a pin and a nut.

In EP 2 333 263 A1 a particle filter is disclosed, which is directly arranged on an internal combustion engine. A filter element of the particle filter is arranged in a housing and fixed in the housing by means of retaining elements.

SUMMARY OF THE INVENTION

The present invention deals with the problem of providing an improved or at least another embodiment for a particle filter of the type mentioned at the outset, which is characterized in particular by a simple installation of the particle filter and/or by a simple replacement of a filter element of the particle filter and/or by an increased tightness of a housing of the particle filter.

The present invention is based on the general idea of arranging a filter element of a particle filter in an inner jacket and to radially support the inner jacket in an outer jacket fixed on the housing and to axially support the same in the outer jacket by means of at least one supporting element so that the particle filter can be easily mounted and/or the filter element easily replaced.

According to the invention idea, the particle filter, which serves for the filtering of exhaust gases of an internal combustion engine, in particular of a motor vehicle, comprises the inner jacket, the outer jacket as well as the filter element and a housing, wherein the inner jacket is arranged axially displaceably in the outer jacket. Furthermore, the particle filter comprises a cover which closes an installation opening of the housing. The installation opening of the housing is provided in particular for axially inserting the inner jacket with the filter element arranged therein in the outer jacket and pulling it out of the jacket. On a face end facing away from the cover, the outer jacket defines an exhaust gas inlet to the filter element, so that the exhaust gas to be filtered reaches the filter element through this exhaust gas inlet. Furthermore, the filter element is supported and preferentially held in the inner jacket. To this end, a bearing mat can be arranged radially between the filter element and the inner jacket, wherein the radial direction runs perpendicularly to an axial direction, which runs along a longitudinal extension of the particle filter or of the inner jacket or a main flow direction of the exhaust gas in the filter element. The inner jacket supporting the filter element in turn is radially supported on the outer jacket in such a manner that the inner jacket is axially moveable or displaceable in the outer jacket. Furthermore, the inner jacket contacts a ring on the outflow side of the filter element, i.e. on the side facing away from the exhaust gas inlet. At least one such supporting element furthermore axially supports the ring on the cover for transmitting pressure forces. This means that the ring and thus the inner jacket and the filter element are secured against pressure forces acting axially in the direction of the cover, which are caused in particular through the flow of the exhaust gas, in particular in that the cover is arranged on the housing and connected to the same.

Practically, the outer jacket is arranged fixed in the housing so that the inner jacket is arranged axially displaceably in the housing. On the side facing away from the cover and thus on the inflow side, a corresponding axial safeguard of the inner jacket can be omitted, in particular since the filter element and thus the inner jacket are pressed in the direction of the cover through the flow of the exhaust gas. Thus, altogether, a simple installation of the particle filter is achieved and additionally simple and secure supporting of the ring and thus of the inner jacket and of the filter element for transmitting pressure forces axially on the cover or an axial safeguard achieved.

With preferred embodiments, pulling forces can also be transmitted from the ring to the supporting element. Accordingly, pulling forces are directed in particular against said pressure forces and therefore act in particular likewise axially. With the help of the transmission of pulling forces on the ring through the supporting element, simplified pulling of the filter element out of the housing is to be achieved in particular. To this end, the ring is furthermore arranged fixed on the inner jacket, wherein embodiments are conceivable in which the ring is designed as an integral part of the inner jacket and also embodiments in which the ring is connected to the inner jacket in a fixed manner in any way, for example welded or screwed. Radially, the ring can furthermore have connecting sections which are directed towards the inside, which in each case serve for connecting the ring to such an associated supporting element. Through the fixed arrangement of the ring on the inner jacket and through the fastening of the supporting element on the ring for transmitting pulling forces, the inner jacket, preferentially with the cover removed, can be pulled out of the outer jacket with the filter element by pulling on the supporting element, so that a simplified removal of the filter element is provided which can be used in particular for replacing the filter element, if applicable including inner jacket, if required.

With preferred embodiments, the respective supporting element comprises a threaded rod, a nut, a cap nut and a bushing. Accordingly, the bushing is arranged fixed on the cover and penetrates the cover while the threaded rod runs through the bushing and is fastened on the ring. Fastening the threaded rod on the ring can be effected for example by means of a screw connection or through welding and the like. The nut is screwed onto the threaded rod on the side of the bushing facing away from the ring and axially supported on the bushing. Furthermore, the cap nut covers the nut and the free end of the threaded rod that is distal from the ring and is additionally screwed to the bushing by means of an outer thread of the bushing, which is formed on the side of the bushing facing away from the ring. Thus, the ring is axially supported on the cover by means of the supporting element for transmitting pressure forces. To this end, the threaded rod can be screwed in particular to the bushing in the bushing. In this case, the nut serves in particular as a lock nut, wherein the threaded rod is additionally rotatably connected to the ring or the bushing is rotatably arranged in the cover. With the help of this design it is also possible in particular to pull the inner jacket and thus the filter element out of the housing in a simplified manner. Thus, the cap nut can be initially unscrewed from the bushing. Following this, the nut can be turned in such a manner that the threaded rod pulls the ring and thus the inner jacket and the filter element out of the outer jacket. Thereafter, the cover can be disconnected from the housing and the filter element and the inner jacket removed or pulled out of the housing.

In an alternative embodiment, the free end of the threaded rod is axially supported on the inside of the cap nut facing the ring. The axial support of the free end of the threaded rod in this case brings about in particular a support of the ring on the cover for transmitting pressure forces.

The inner jacket and the outer jacket can be arranged radially spaced from one another at least in regions in order to reduce in particular the transmission of vibrations from the filter element or the inner jacket to the outer jacket and thus to the housing or ensure better thermal insulation. Thus, the exhaust gas can flow into the hollow space radially formed between the inner jacket and the outer jacket and worsen or reduce tightness of the particle filter or of the housing. In preferred embodiments, at least one sealing element is arranged between the inner jacket and the outer jacket which in particular serves for preventing the flow of the exhaust gas between the inner jacket and the outer jacket or for the sealing of a corresponding leakage. Accordingly, such a sealing element can be radially arranged between the inner jacket and the outer jacket both on the inflow side as well as on the outflow side or in between. Embodiments are also conceivable, in which multiple such sealing elements are arranged radially between the inner jacket on the outflow side and/or inflow side and/or in between. Such a sealing element can in particular be designed ring-shaped or ring segment-shaped and accordingly run along the outer circumference of the inner jacket or of the inner circumference of the outer jacket or the circumferential direction.

Practically, such a sealing element has a resilient characteristic and is formed in particular as a spring element, wherein the sealing element is preferentially configured radially resilient. Accordingly, the sealing element during the installation is radially preloaded and subsequently introduced into the hollow space. The resilient characteristic of the sealing element results in particular in that the radially preloaded sealing element upon arrangement between the inner jacket and the hollow space radially formed between the inner jacket and the outer jacket entirely fills out in the associated region in order to ensure as sufficient as possible a sealing with respect to the flow of the exhaust gas through the corresponding region.

In principle, such a sealing element can be realized in any way provided it ensures sealing of the hollow space radially between the inner jacket and the outer jacket. In preferred embodiments, at least one such sealing element comprises a bead. Accordingly, such a sealing element can comprise any type of such a bead, in particular a half bead, a full bead or a double bead. The sealing element comprising the bead has the advantage in particular that it can be favorably produced on the one hand and ensures simplified installation and adequate sealing on the other hand.

Alternatively or additionally, embodiments are conceivable in which at least one such sealing element comprises a wire fabric or is formed as such a wire fabric. Accordingly, the wire fabric is practically configured tight in order to ensure adequate sealing and/or an adequately resilient characteristic.

Preferentially, the respective sealing element is designed or configured in such a manner and/or mounted on the housing in such a manner that on removing the inner jacket or the filter element and in particular when replacing the filter element and/or the inner jacket, it can likewise be replaced.

Practically, the particle filter comprises a seal retainer for retaining the sealing element. Retaining in this case is to mean in particular an axial supporting of the associated sealing element. Accordingly, the seal retainer can be arranged on the inner jacket so that it is directly or indirectly supported on the ring and accordingly on the cover and when the ring and accordingly the inner jacket is pulled out of the housing, it can likewise be pulled out of the housing. Accordingly, the seal retainer can be arranged fixed on the inner jacket and be connected for example on the inner jacket or formed on the inner jacket or integrally formed on the inner jacket. Alternatively or additionally, the seal retainer can be arranged fixed on the ring and for example be connected to the ring and/or formed on the ring, in particular integrally formed on the ring. Obviously, multiple such seal retainers can also be provided, each of which are designed or configured equal or different. Furthermore, the respective seal retainer can retain such an associated sealing element or multiple such sealing elements.

Practically, the seal retainer and the associated sealing element are designed complementarily. In particular, it can be provided that the seal retainer engages in a mounting of the associated sealing element, thus retaining the sealing element.

The respective mounting of the sealing element can be realized through a corresponding recess in the sealing element. Embodiments are also conceivable, in which such a mounting is realized through a corresponding shape of the sealing element. Thus, such a sealing element can comprise two interconnected sections running parallel which form such a mounting.

Through the interaction of the sealing retainer with the associated sealing element, an additional axial safeguard of the inner jacket or of the ring can be brought about. Likewise, the respective sealing element can bring about a radial supporting of the inner jacket and/or of the ring, in particular on the outer jacket.

Generally, the cover can close off the installation opening of the housing in any way. In preferred embodiments, the cover is connected to an opening edge by means of a clamp, which can in particular be configured as a V-clamp and/or as a V-band clamp, which encloses the installation opening. Thus, the installation opening can be opened through corresponding disconnecting of the clamp and thus detaching of the cover from the installation opening or from the opening edge in order to in particular pull the filter element and/or the inner jacket and/or the ring out of the installation opening.

The opening edge which encloses the installation opening at least in regions is preferentially formed on an outer wall of the housing which runs radially relative to the outer jacket. Accordingly, the outer wall is practically connected on the outer jacket and in particular welded to the outer jacket.

For letting out the exhaust gas flowing through the filter element and leaving the filter element an outlet element can for example be provided, which is axially arranged between the cover and the ring. In preferred embodiments, such an outlet element is formed as a hollow cylinder and configured in such a manner that it radially lets out the exhaust gas axially leaving the filter element. To this end, radial outlet openings can be provided in particular. The outlet element can thus be configured in particular as a sleeve having radial openings, which correspond to said outlet openings. The outer wall of the housing can serve in particular for conducting or bounding the exhaust gas flowing out of the outlet element. Accordingly, the outer wall is arranged in particular on the side of the outlet element facing the cover and runs along the outer circumference of the outlet element. Additionally, the particle filter can comprise an inner wall, which likewise serves in particular for conducting the exhaust gas flowing out of the outlet openings of the outlet element and in this case is arranged on a side of the outlet element facing away from the cover.

Accordingly, the inner wall, like the outer wall, preferentially runs radially relative to the outer jacket and is connected in particular welded to the outer jacket. Thus, an outflow channel is formed by means of the inner wall and the outer wall which conducts the exhaust gas flowing out of the outlet openings of the outlet element radially to the outside.

Preferably, the inner jacket can be axially pulled out through the outlet element. The ring can also be practically pulled axially out of the outlet element so that the pulling out of the ring and thus of the inner jacket or of the filter element from the housing is not prevented through the outlet element.

The supporting of the outlet element can be realized in particular in that the outlet element axially projects into the opening edge of the installation opening and is radially supported on the opening edge. Analogously, the outlet element can also be arranged in the outer jacket or in the inner wall or an axial section of the inner wall. Thus, the outlet element can be radially supported in particular in the region of the outer wall and/or of the inner wall.

The outlet element is practically fixed relative to the outer jacket. This means that the outlet element can be connected to the outer jacket or is connected on the inner wall and/or outer wall connected to the outer jacket. In preferred embodiments, the outlet element is integrally formed on the outer jacket so that the connection of the inner wall and/or of the outer wall to the outer jacket is realized by means of the outlet element.

It is to be understood that the particle filter can comprise multiple supporting elements which can be arranged distributed in any way. Practically, the respective supporting elements are evenly distributed along the circumferential direction in order to ensure an even support of the ring and thus of the inner jacket or of the filter element. In particular, the respective supporting element can be arranged along the inner circumference of the inner jacket so as not to influence the flow of the exhaust gas and/or in order to minimize the interaction of the supporting element with the exhaust gas.

Practically, the ring is designed in such a manner that it makes possible as frictionless as possible a flow of the exhaust gas. Accordingly, the ring has as low as possible a radial extension.

For retaining the ring, the ring can be supported on the outer jacket, wherein the ring is axially displaceable in order to ensure the pulling-out of the ring and thus of the inner jacket and/or of the filter element from the housing. Alternatively or additionally, the ring can be radially supported on the outlet element, wherein the ring is also axially displaceable in the outlet element.

In principle, the ring can have any profile provided it directly or indirectly axially supports the inner jacket and can be supported on the cover through the supporting element. Accordingly, the ring can for example have a Z-profile, an S-profile, an L-profile or a U-profile, wherein the profile with respect to a longitudinal section is defined by the particle filter.

Furthermore, a supporting element can be arranged axially between the ring and the filter element at least in regions in order to axially support the filter element on the ring. Accordingly, the supporting element is preferably designed or configured in such a manner that it can also absorb or dampen vibrations of the filter element. The ring can also be designed or configured in such a manner that it can absorb or dampen corresponding vibrations of the filter element or of the inner jacket.

For checking the tightness of the housing, a leakage channel can be provided furthermore which penetrates the outer jacket and is in particular fluidically connected to the hollow space which is radially formed between the inner jacket and the outer jacket.

Accordingly, a leakage test for checking the tightness of the housing can be performed in that compressed air is introduced into the hollow space through the leakage channel in order to for example measure a retaining pressure or a pressure loss. During such a leakage check it is required however that at least one such sealing element is arranged on the inflow side and on the outflow side of the leakage channel.

Such a check of the tightness of the housing or such a leakage test can be effected in particular following the replacement of the filter element and/or of the inner jacket, during which at least one such sealing element can also be replaced.

Radial supporting of the inner jacket on the outer jacket can take place with the help of at least one molding of the outer jacket which is radially directed to the inside. Such a molding in this case can run along the entire circumferential direction or along a segment of the circumferential direction of the outer jacket. Multiple such moldings can also be arranged along the circumferential direction at the same axial height or at different axial heights. Additionally, the respective molding can have any shape and be formed in particular symmetrically or unsymmetrically. Such a radial supporting of the inner jacket on the outer jacket likewise leads to a reduction of the vibrations of the inner jacket or to a damping of the vibrations of the inner jacket and/or to a reduced transmission of the vibrations of the inner jacket onto the outer jacket.

It is to be understood that the particle filter according to the invention can be utilized for filtering the exhaust gas of internal combustion engines of any kind. In particular, the particle filters according to the invention can be diesel particle filters for an internal combustion engine operated with diesel, in particular for a utility vehicle.

According to an advantageous further development, the particle filter according to the invention is part of an exhaust treatment device for an internal combustion engine.

In preferred embodiments, a muffler for an exhaust system of an internal combustion engine comprises such a particle filter, wherein the housing of the particle filter is formed by a section of a muffler housing of the muffler.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description, wherein same reference characters relate to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
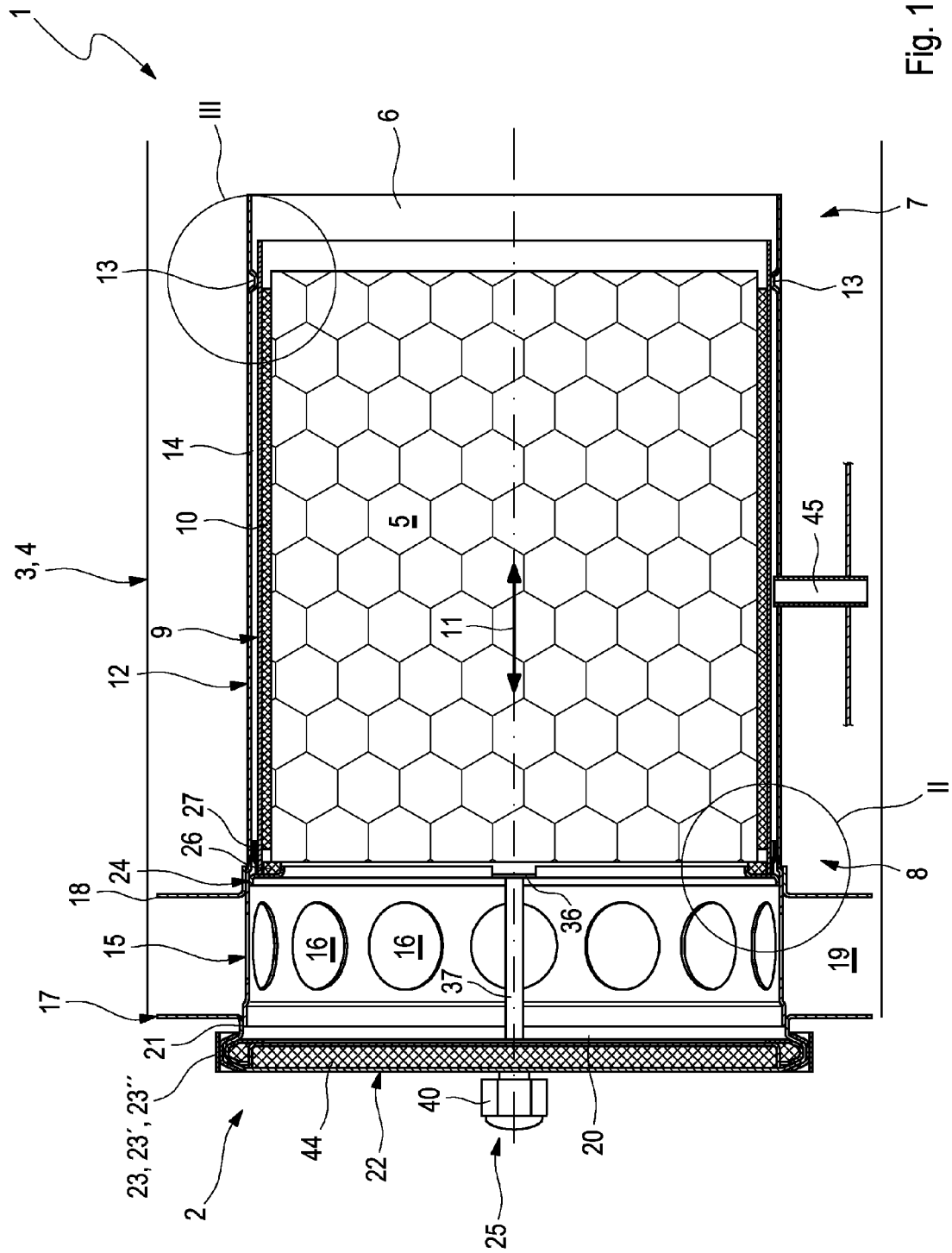
FIG. 1 is a longitudinal sectional view through a muffler with a particle filter.

Referring to the drawings, FIG. 1 shows a muffler 1 with a particle filter 2, wherein a section of a muffler housing 3 of the muffler 1 forms a housing 4 of the particle filter 2. The particle filter 2 comprises a filter element 5, which is subjected to a through-flow of exhaust gas of an internal combustion engine, for example of a motor vehicle, in particular of a utility vehicle, which through an exhaust gas inlet 6 of the particle filter 2 reaches the filter element 5 in which it is freed of particles such as for example soot and accordingly filtered. The exhaust gas thus flows on an inflow side 7 into the filter element and on an outflow side 8 again out of the filter element 5. The filter element 5 is for example a ceramic or any other filter element 5.

The filter element 5 is supported or held in an inner jacket 9, wherein radially between the inner jacket 9 and the filter element 5 a bearing mat 10 is arranged. Accordingly, the radial direction runs perpendicularly to an axial direction 11, wherein the axial direction 11 is defined with respect to the longitudinal extension of the particle filter 2 or of the inner jacket 9 or of the main flow direction of the exhaust gas in the filter element 5. The inner jacket 9 is arranged axially displaceably in an outer jacket 12 fixed on the housing, wherein moldings 13 of the outer jacket 12 directed radially to the inside support the inner jacket 9 radially on the outer jacket. Thus, a hollow space 14 is formed radially between the inner jacket 9 and the outer jacket 12.

On its side facing away from the exhaust gas inlet 6, the outer jacket 12 comprises an outlet element 15 of hollow-cylindrical design, which radially lets out the exhaust gas axially flowing out of the filter element 15. To this end, the outlet element 15 comprises radially arranged outlet openings 16. Furthermore, an outer wall 17 and an inner wall 18 are provided, which are connected, for example welded to the outlet element 15 and thus to the outer jacket 12 and run radially relative to the outer jacket 12. The outer wall 17 and the inner wall 18 in this case surround the outlet openings 16 of the outlet element 15 in such a manner that the inner wall 18 and the outer wall 17 form a flow channel 19 for the exhaust gas flowing out of the outlet openings 16, which lead the exhaust gas radially away to the outside.

On the side facing away from the exhaust gas inlet 6, the particle filter 2 comprises an installation opening 20, which is enclosed by an opening edge 21, wherein the opening edge 21 is formed on the outer wall 17. A cover 22 is connected to the opening edge 21 by means of a clamp 23, in particular a V-clamp 23' or a V-band clamp 23", thus closing off the installation opening 20.

The inner jacket 9 is axially supported on a ring 24 on the outlet flow side and thus on its side facing away from the exhaust gas inlet 6 and connected to the ring 24 in a fixed manner. In addition, a supporting element 25 can be seen in the section shown in FIG. 5, which axially supports the ring 24 on the cover 22 for transmitting pressure forces, wherein the particle filter 2 preferably comprises two or three multiple such supporting elements 25. This means that the supporting element 25 and the ring 24 are connected to one another and/or arranged on one another in such a manner that forces axially acting in the direction of the cover 22 and thus pressure forces, which are created in particular through the flow of the exhaust gas, are transmitted from the ring 24 onto the supporting element 25 and thus onto the cover 22.

Thus, the ring 24 and accordingly the inner jacket 9 and the filter element 5 are supported on the cover 22 against axial pressure forces.

Figure 2:
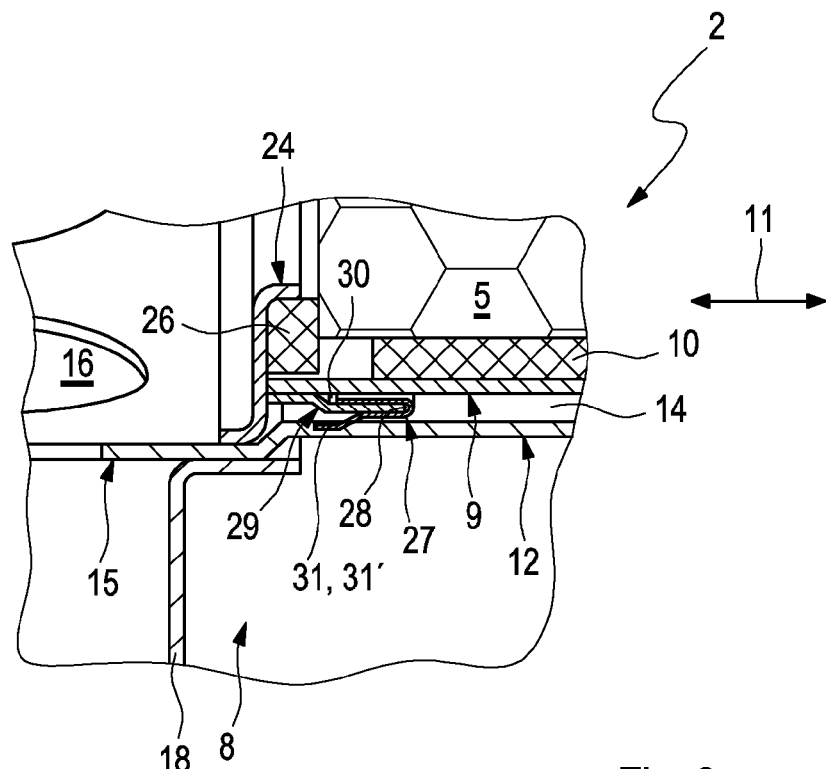
FIG. 2a is an enlarged representation of the section designated II in FIG. 1, showing one of different embodiments.
FIG. 2b is an enlarged representation of the section designated II in FIG. 1, showing another of different embodiments.
FIG. 2c is an enlarged representation of the section designated II in FIG. 1, showing another of different embodiments.
FIG. 2d is an enlarged representation of the section designated II in FIG. 1, showing another of different embodiments.
Figure 2:
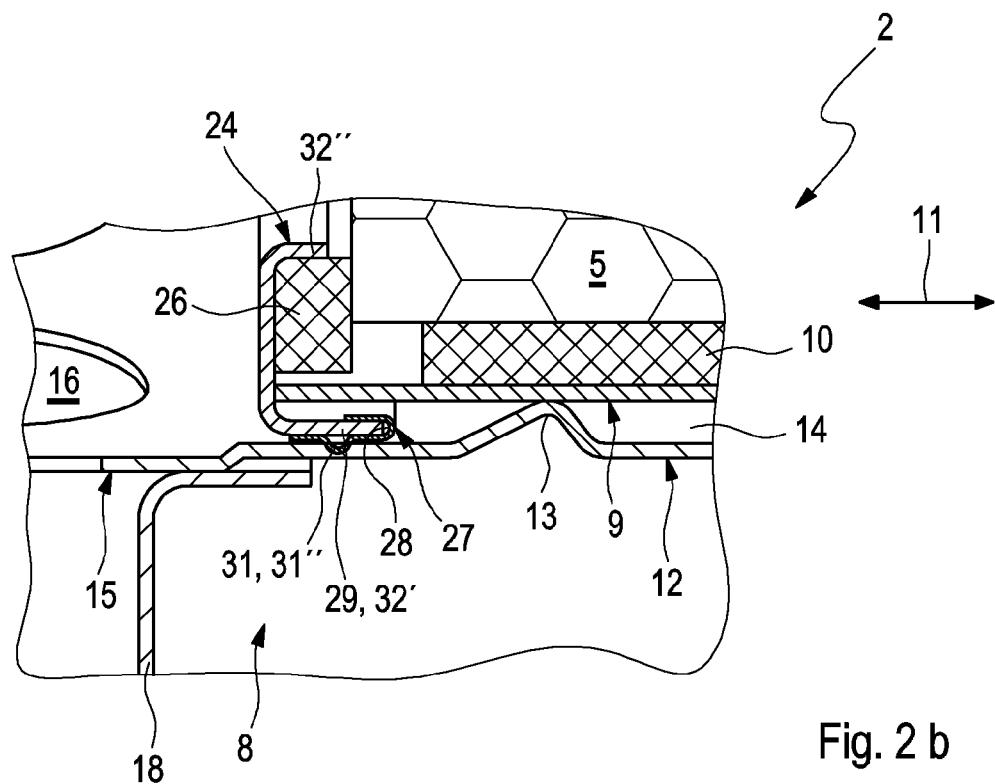
Figure 2:
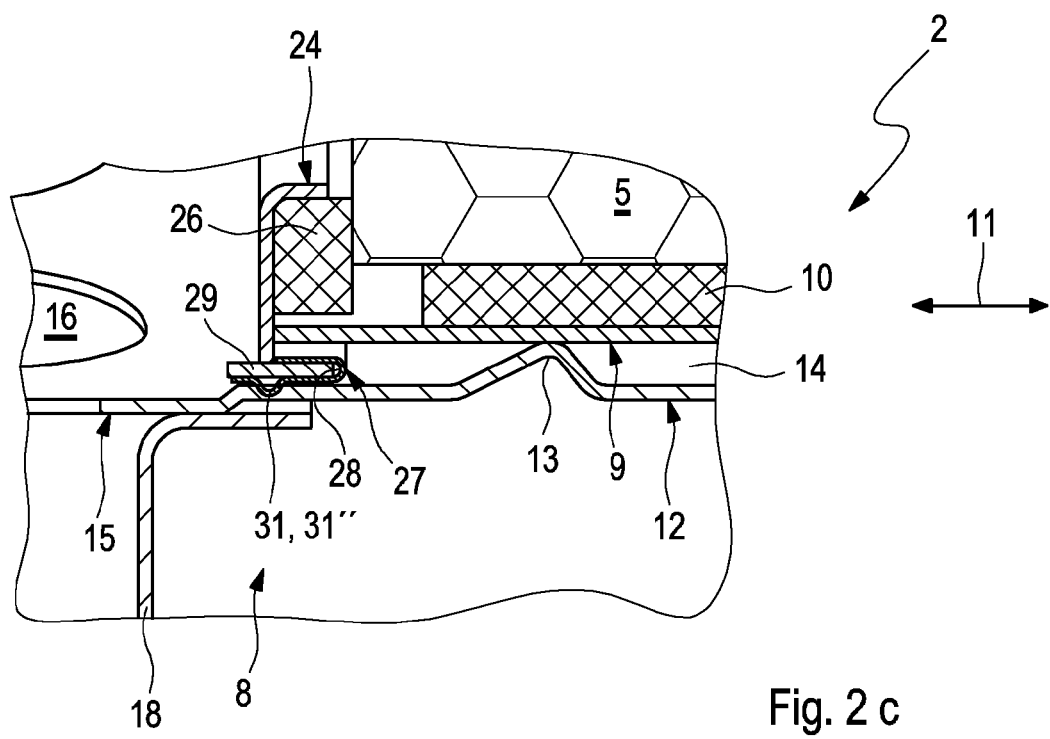
Figure 2:
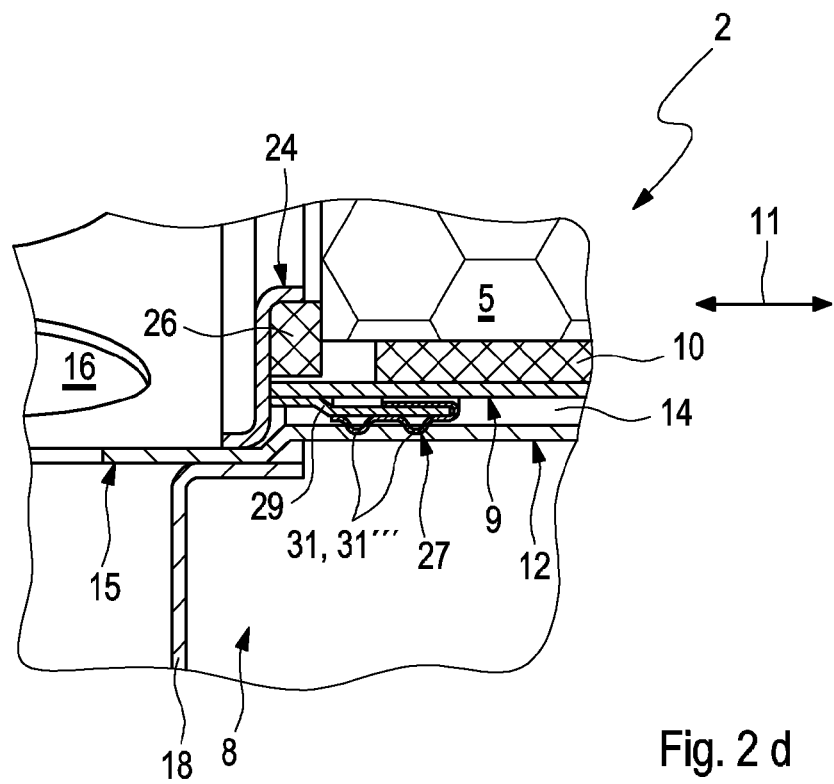

The FIG. 2 show an enlarged representation of the section of such a particle filter 2 designated II. In FIG. 2a it is visible that the ring 24 has a Z-shaped or S-shaped profile and is radially supported on the outer jacket 12 and on the outlet element on the radially outer side and axially displaceable in the outer jacket 12 and in the outlet element 15. On the radially outer side, the ring 24 encloses a supporting element 26, which is axially arranged between the ring 24 and the filter element 5. In the section running radially, the ring 24 contacts the inner jacket 9 and is connected to the inner jacket 9. Furthermore, a sealing element 27 is arranged in the hollow space 14 radially formed between the outer jacket 12 and the inner jacket 9, which is designed radially resiliently and shown in the relaxed state. The sealing element 27 serves the purpose of preventing the flow of exhaust gas entering the hollow space 14 through the exhaust gas inlet 6 and to thus seal off the housing 4 and the hollow space 14. Accordingly, the sealing element 27 comprises a mounting 28, which is formed through two sections of the sealing element 27 running parallel in axial direction 11 and which are connected to one another and in which a seal retainer 29 engages. The seal retainer 29 is arranged fixed on the interior jacket 9 so that the sealing element 27 is axially held by means of the seal retainer 29. Furthermore, the sealing element 27 in the installed or clamped state, which can be achieved by sliding the seal retainer 29 into the mounting 28, entirely closes off the radial cross section of the hollow space 14 in the region of the seal retainer 29. To reinforce the seal retainer 29, a radially running web 30 is provided. The sealing element 27 shown in FIG. 2A additionally comprises a bead 31, which is formed as a half bead 31', so that the clamping of the sealing element 27 or the resilient characteristic can be achieved by means of the bead 31.

FIG. 2b shows an alternative embodiment, in which the ring 24 has a U-shaped profile, wherein the radially outer leg 32' of the ring 24 is designed axially larger than the radially inner leg 32". Furthermore, the seal retainer 29 is formed through the radially outer leg 32' of the ring 24. In addition, the sealing element 27 comprises such a bead 31, which is formed as a full bead 31". Furthermore, in the case of the embodiment shown in FIG. 2b, the axial support, in contrast with the previously shown embodiment, of the inner jacket 9 on the outer jacket 12 is alternatively or additionally realized on the outflow side by such a molding 13 of the outer jacket 12.

In the embodiment shown in FIG. 2c, the ring 24 in contrast with the embodiment shown in FIG. 2b has an L-profile, wherein the seal retainer 29 is connected to the ring on the radially outer side of the ring 24. In the embodiments shown in FIGS. 2b and 2c, radial supporting of the ring 24 is effected on the inner jacket 9 and on the outlet element 15 respectively, i.e. via the sealing element 27 and the seal retainer 29 respectively.

A further embodiment is shown in FIG. 2d, wherein this embodiment differs from the embodiment shown in FIG. 2a in that the sealing element 27 has a double bead 31''' as bead 31. Accordingly, the seal retainer 29 is designed axially larger.

Figure 3:
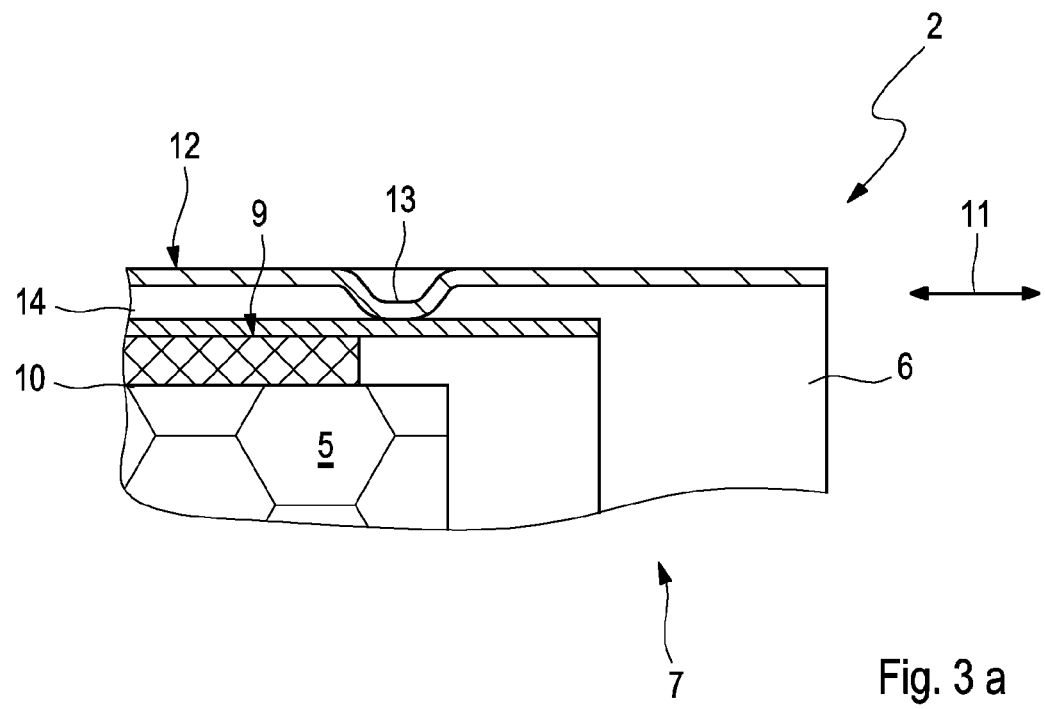
FIG. 3a is an enlarged representation of the section designated III in FIG. 1, showing one of different embodiments.
FIG. 3b is an enlarged representation of the section designated III in FIG. 1, showing another of different embodiments.
FIG. 3c is an enlarged representation of the section designated III in FIG. 1, showing another of different embodiments.
Figure 3:
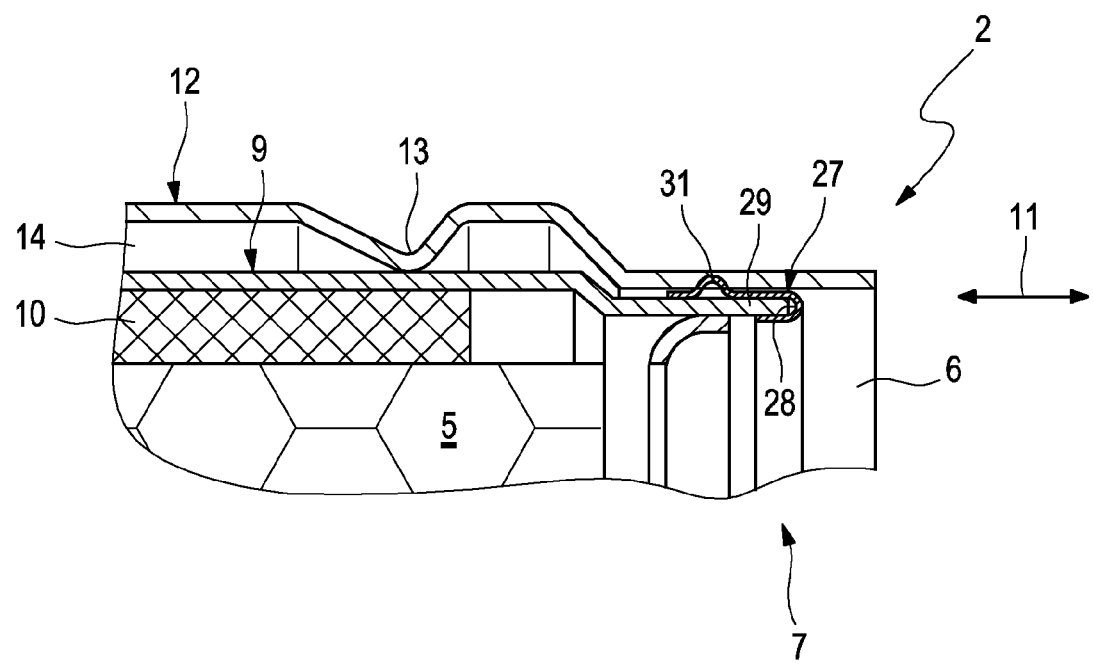
Figure 3:
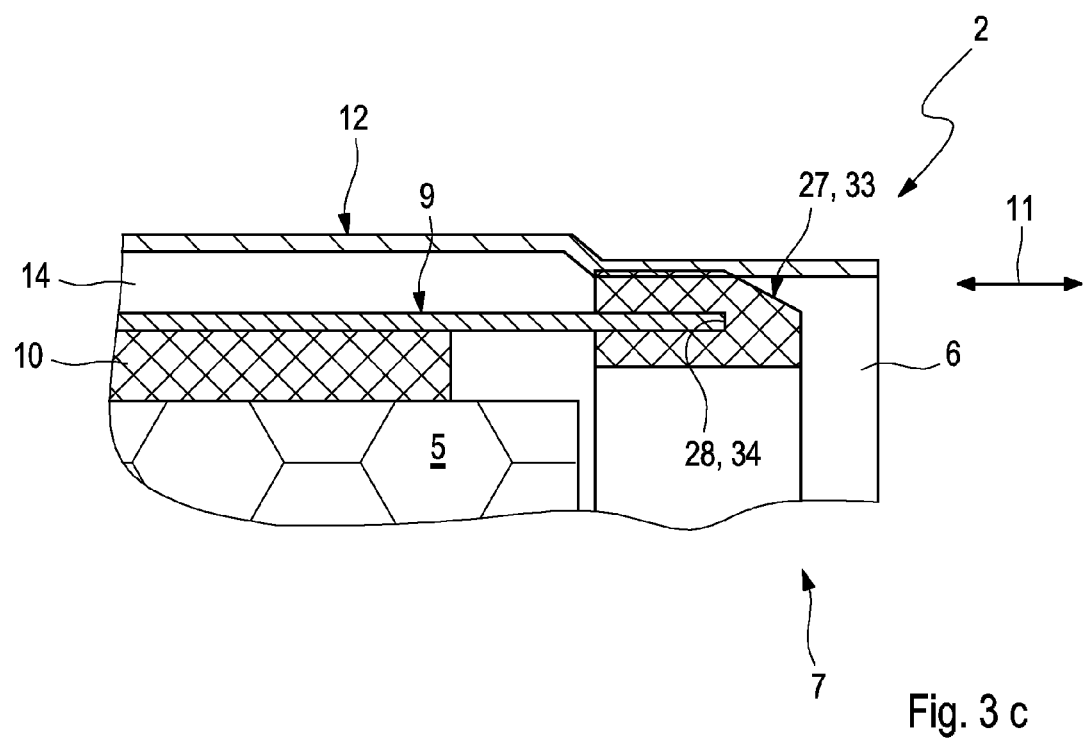

The FIG. 3 show an enlarged representation of the detail of such a particle filter 2 designated III. Here it is visible in FIG. 3a that the molding 13 of the outer jacket 12 for the radial supporting of the inner jacket 9 does not run along the entire circumference of the outer jacket 12. In addition, the forming 13 is designed symmetrically in axial direction 11.

In contrast with the embodiment shown in FIG. 3a and FIG. 1 respectively, FIG. 3b shows such a sealing element 27, which is additionally or alternatively arranged on the inflow side radially between the inner jacket 9 and the outer jacket 12. The sealing element 27 additionally comprises a bead 31. Accordingly, the seal retainer 29 is integrally formed on the inner jacket 9 and realized through a radial tapering of the inner jacket 9, wherein the outer jacket 12 also tapers in this region, so that the sealing element 27 in this region is radially arranged between the inner jacket 9 and the outer jacket 12 and clamped in by these. In addition, the forming 13 of the outer jacket 12 in axial direction 11 is designed unsymmetrically.

In the embodiment shown in FIG. 3c, the sealing element 27 is realized as a wire fabric 33 or wire braiding 33, wherein the wire fabric 33 comprises a recess 34, which is designed as mounting 28 for the seal retainer 29 integrally formed on the inner jacket 9. Furthermore, the outer jacket 12 tapers in the region in which the sealing element 27 formed as wire fabric 33 is arranged. Thus, the inner jacket 9 is supported alternatively or additionally to such a molding 13, radially on the outer jacket 12 by means of the sealing element 27.

Figure 4:
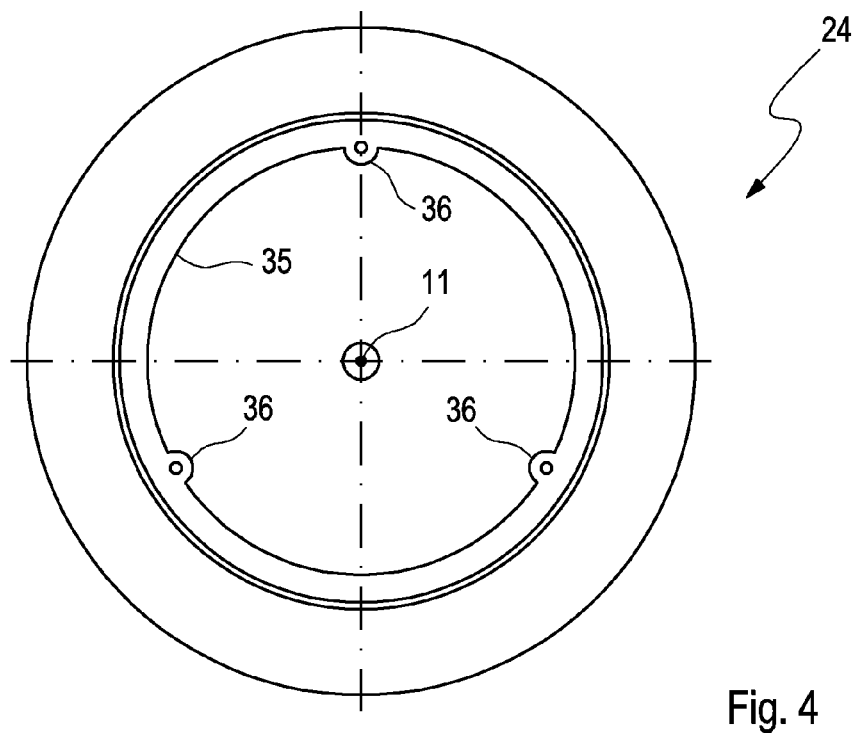
FIG. 4 is a cross sectional view through a ring.

FIG. 4 shows a cross section through such a ring 24. Here it is visible that the ring 24 comprises connecting sections 36 radially directed to the inside along its inner circumference 35, which serve for connecting the ring 24 to the supporting element 25. Accordingly, the connecting sections 36 and thus the associated supporting elements 25 are evenly distributed in the circumferential direction in order to ensure the correspondingly even support or connection of the ring 24 on the supporting element 25 and thus on the cover 22.

Figure 5:
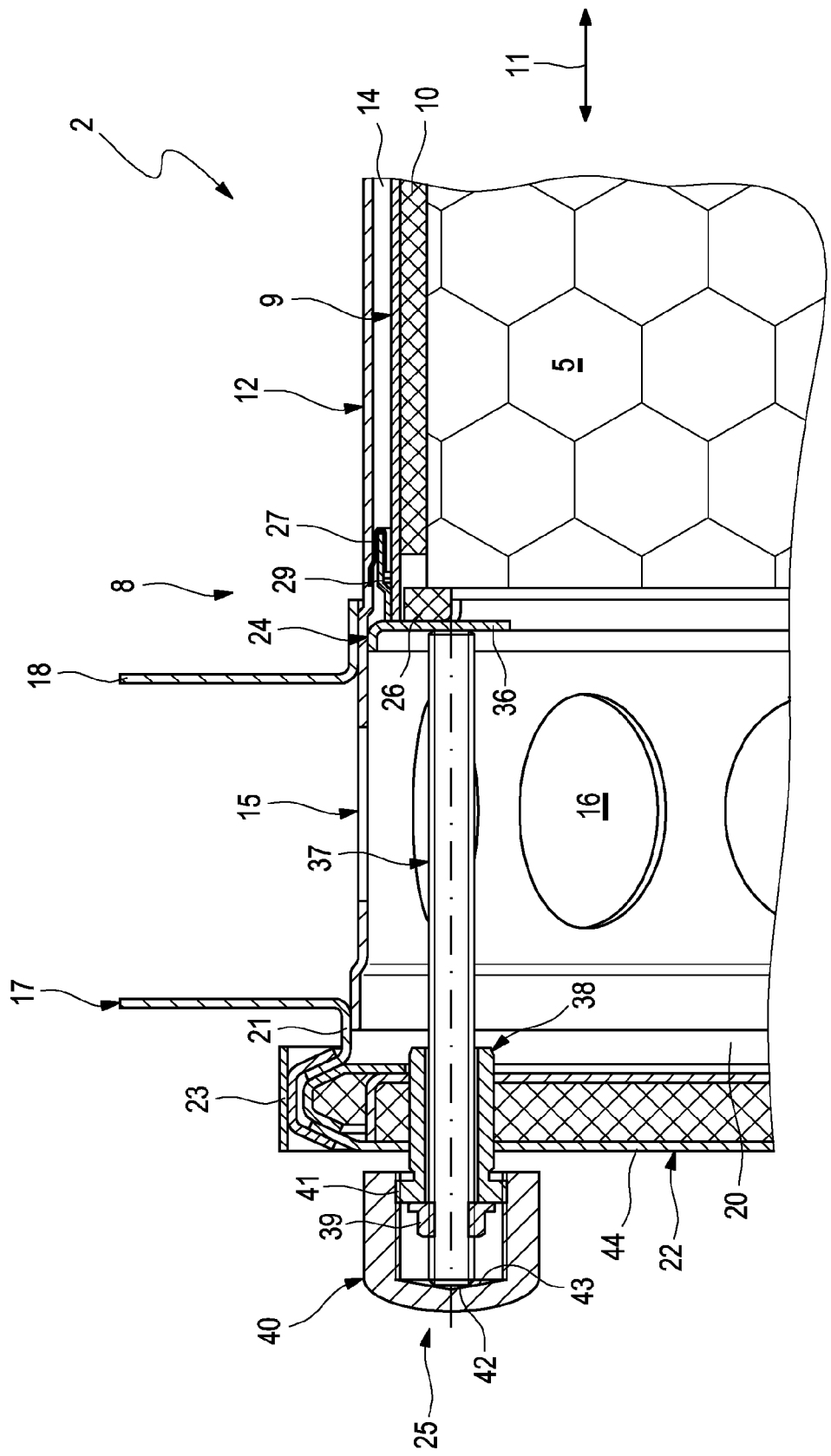
FIG. 5 is a longitudinal sectional view through a particle filter in the region of a supporting element.

A preferred embodiment of the supporting element 25 is shown in FIG. 5. The supporting element 25 comprises a threaded rod 37, a bushing 38, a nut 39 and a cap nut 40. The bushing 38 penetrates the cover 22 and is arranged fixed on the cover 22 and for example pressed or screwed into the cover 22. The threaded rod 37 runs through the bushing 38 and through the outlet element 15 and is connected to the ring 24, in particular with such an associated connecting section 36 of the ring 24, for example screwed or welded. On the side of the bushing 38 facing away from the ring 24, the nut 39 is screwed onto the threaded rod 37 and additionally supported axially on the bushing 38. Thus, it is possible by tightening the nut 39 to pull the threaded rod 37 and thus the ring 24 and the inner jacket 9 as well as the filter element 5 out of the inner jacket 12 and thus out of the housing 4. To support the ring 24 and thus the inner jacket 9 and the filter element 5 on the cover 22 for transmitting pressure forces, the cap nut 40 is screwed to the bushing 38 by means of an outer thread 41 of the bushing 38 formed on the side of the bushing 38 facing away from the ring 24. The cap nut 40 accordingly covers the nut 39 and the free end 32 of the threaded rod 37 that is distal from the ring 24. Furthermore, the free end 42 of the threaded rod 37 on the inside 43 of the cap nut 40 is axially supported on the cap nut 40. Accordingly, the ring 24 and thus the inner jacket 9 and the filter element 5 can be pulled out of the outer jacket 12 in that initially the cap nut 40 is unscrewed and subsequently the nut 39 is screwed on, by way of which the threaded rod 37 including ring 24 and thus inner jacket 9 and filter element 5 axially move in the direction of the installation opening 20. Following this, the clamp 23 is disconnected and the cover 22 removed from the installation opening 20 in order to pull the ring 24 and thus the inner jacket 9 and the filter element 5 out of the inner jacket 12 in particular with the help of the threaded rod 37.

In FIG. 5 it is visible furthermore that the cover 22 is designed as a hollow body in which insulating material 44 for the thermal insulation and/or for damping of vibrations is arranged. The moldings 37 as well as the bearing mat 10 and the supporting element 26 can also serve for damping vibrations.

To check the tightness of the housing 4 of the particle filter 2, a leakage channel 45 is provided furthermore which, as is visible in FIG. 1, penetrates the outer jacket 12 and is fluidically connected to the hollow space 14.

While specific embodiments of the invention have been shown and described in detail to illustrate the application of the principles of the invention, it will be understood that the invention may be embodied otherwise without departing from such principles.

The invention claimed is:

1. A particle filter for filtering exhaust gases of an internal combustion engine of a motor vehicle, the particle filter comprising:
a filter element;
a housing with an installation opening;
an outer jacket;
an inner jacket arranged axially displaceably in the outer jacket, the inner jacket being axially inserted into the outer jacket and can be pulled out of the outer jacket through the installation opening;
a cover closing off the installation opening, the filter element being supported in the inner jacket, the inner jacket being radially supported by the outer jacket;
a ring, the inner jacket contacting the ring on an outflow side of the filter element; and
at least one supporting element axially supporting the ring on the cover to transit pressure forces, the supporting element comprising a threaded rod and a nut and a cap nut and a bushing, the bushing penetrating the cover and the bushing being arranged fixed on the cover, the bushing having an outer thread on a side facing away from the ring, the threaded rod being fastened on the ring and the threaded rod extending through the bushing, the nut being screwed onto the threaded rod on a side of the bushing facing away from the ring and the nut being axially supported on the bushing, the cap nut covering the nut and a free end of the threaded rod that is distal from the ring and the cap nut being screwed to the bushing by means of the outer thread.

2. A particle filter according to claim 1, wherein:
the at least one supporting element is fastened on the ring for transmitting pulling forces;
the ring is arranged fixed on the inner jacket, so that with removed cover the inner jacket with the filter element can be pulled out of the outer jacket by pulling on the supporting element.

3. A particle filter according to claim 1, wherein the free end of the threaded rod is axially supported on an inside of the cap nut.

4. A particle filter according to claim 1, further comprising at least one sealing element wherein radially between the inner jacket and the outer jacket the at least one sealing element is arranged.

5. A particle filter according to claim 4, wherein the at least one sealing element comprises a bead.

6. A particle filter according to claim 4, wherein the at least one sealing element comprises a wire fabric.

7. A particle filter according to claim 4, further comprising seal retainer arranged on the inner jacket, wherein the sealing element is held on the seal retainer.

8. A particle filter according to claim 1, further comprising a clamp wherein the cover is connected by means of the clamp to an opening edge encasing the installation opening, which is formed on an outer wall of the housing which runs radially relative to the outer jacket.

9. A particle filter according to claim 1, hollow-cylindrical outlet element axially between the cover and the ring, the hollow-cylindrical outlet element radially letting out the exhaust gas axially exiting the filter element.

10. A particle filter according to claim 9, wherein the outlet element is integrally formed on the outer jacket.

11. A particle filter according to claim 9, wherein the ring is radially supported on at least one of the outer jacket and the outlet element and is axially displaceable.

12. A particle filter according to claim 1, further comprising a leakage channel penetrating the outer jacket for checking the tightness of the housing.

13. A particle filter according to claim 1, wherein the outer jacket has at least one molding radially directed to an inside for radially supporting the inner jacket.

14. A muffler for an exhaust system of an internal combustion engine, the muffler comprising:
a particle filter comprising:
a filter element;
a housing with an installation opening;
an outer jacket;
an inner jacket arranged axially displaceably in the outer jacket, the inner jacket being axially inserted into the outer jacket and can be pulled out of the outer jacket through the installation opening;
a cover closing off the installation opening, the filter element being supported in the inner jacket, the inner jacket being radially supported by the outer jacket;
a ring, the inner jacket contacting the ring on an outflow side of the filter element; and
at least one supporting element axially supporting the ring on the cover to transit pressure forces, wherein the housing of the particle filter is formed by a section of a muffler housing, the supporting element comprising a threaded rod and a nut and a cap nut and a bushing, the bushing penetrating the cover and the bushing being arranged fixed on the cover, the bushing having an outer thread on a side facing away from the ring, the threaded rod being fastened on the ring and the threaded rod extending through the bushing, the nut being screwed onto the threaded rod on a side of the bushing facing away from the ring and the nut being axially supported on the bushing, the cap nut covering the nut and a free end of the threaded rod that is distal from the ring and the cap nut being screwed to the bushing by means of the outer thread.

15. A muffler according to claim 14, wherein:
the at least one supporting element is fastened on the ring for transmitting pulling forces;
the ring is arranged fixed on the inner jacket, so that with removed cover the inner jacket with the filter element can be pulled out of the outer jacket by pulling on the supporting element.

16. A muffler according to claim 14, wherein the free end of the threaded rod is axially supported on an inside of the cap nut.

17. A muffler according to claim 14, further comprising at least one sealing element wherein radially between the inner jacket and the outer jacket the at least one sealing element is arranged.

18. A muffler according to claim 14, further comprising a clamp wherein the cover is connected by means of the clamp to an opening edge encasing the installation opening, which is formed on an outer wall of the housing which runs radially relative to the outer jacket.

19. A muffler according to claim 14, wherein the nut is in direct contact with the threaded rod, the bushing being in direct contact with the outer thread of the threaded rod, the threaded rod being in direct contact with the ring.

20. A particle filter according to claim 1, wherein the nut is in direct contact with the threaded rod, the bushing being in direct contact with the outer thread of the threaded rod, the threaded rod being in direct contact with the ring.

\* \* \* \* \*